United States Patent
Sippel et al.

(10) Patent No.: US 10,641,111 B2
(45) Date of Patent: May 5, 2020

(54) TURBINE BLADE ASSEMBLY WITH CERAMIC MATRIX COMPOSITE COMPONENTS

(71) Applicants: Rolls-Royce Corporation, Indianapolis, IN (US); Rolls-Royce North American Technologies Inc., Indianapolis, IN (US)

(72) Inventors: Aaron D. Sippel, Zionsville, IN (US); Ted J. Freeman, Danville, IN (US); Loic Fabries, West Lafayette, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 76 days.

(21) Appl. No.: 16/119,591

(22) Filed: Aug. 31, 2018

(65) Prior Publication Data
US 2020/0072065 A1   Mar. 5, 2020

(51) Int. Cl.
*F01D 5/30* (2006.01)
*F01D 5/28* (2006.01)

(52) U.S. Cl.
CPC .......... *F01D 5/3069* (2013.01); *F01D 5/284* (2013.01); *F05D 2220/32* (2013.01); *F05D 2230/60* (2013.01); *F05D 2240/20* (2013.01); *F05D 2240/80* (2013.01)

(58) Field of Classification Search
None
See application file for complete search history.

(56) References Cited

U.S. PATENT DOCUMENTS

| | | | | |
|---|---|---|---|---|
| 2,394,124 A * | 2/1946 | Warren | ...................... | F01D 5/16 416/229 R |
| 2,821,357 A * | 1/1958 | Schorner | ................ | F01D 5/3084 416/217 |
| 2,982,518 A * | 5/1961 | Hunt, Jr. | .................. | F01D 5/326 416/221 |
| 3,922,109 A * | 11/1975 | Hagen | .................... | F01D 5/3007 416/213 R |
| 4,094,615 A | 6/1978 | Glenn | | |
| 4,102,602 A * | 7/1978 | Rottenkolber | ........ | F01D 5/3084 416/221 |
| 4,142,836 A * | 3/1979 | Glenn | ..................... | F01D 5/147 416/193 A |
| 4,169,694 A * | 10/1979 | Sanday | ................. | F01D 5/3007 416/219 R |
| 4,280,795 A | 7/1981 | Trousdell | | |
| 4,460,315 A * | 7/1984 | Tseng | ..................... | F01D 5/3038 416/216 |
| 4,573,876 A * | 3/1986 | Egan | ...................... | B22D 19/00 219/121.13 |
| 4,592,120 A * | 6/1986 | Egan | ...................... | B23P 15/006 164/100 |
| 5,405,245 A * | 4/1995 | Cornelius | ............. | F01D 5/3053 416/215 |

(Continued)

*Primary Examiner* — Michael Lebentritt
(74) *Attorney, Agent, or Firm* — Barnes & Thornburg LLP

(57) ABSTRACT

A wheel assembly for a gas turbine engine includes a disk and a plurality of blades. The disk is configured to rotate about an axis during operation of the gas turbine engine. The blades each include a circumferentially extending root received in the disk and an airfoil that extends radially away from the root.

20 Claims, 8 Drawing Sheets

(56) References Cited

U.S. PATENT DOCUMENTS

| | | | |
|---|---|---|---|
| 5,599,170 A * | 2/1997 | Marchi | F01D 5/22 416/190 |
| 6,250,883 B1 * | 6/2001 | Robinson | F01D 5/025 416/198 A |
| 6,457,942 B1 | 10/2002 | Forrester | |
| 7,284,958 B2 | 10/2007 | Dundas et al. | |
| 7,762,781 B1 * | 7/2010 | Brown | F01D 5/147 416/193 A |
| 7,972,113 B1 | 7/2011 | Davies | |
| 8,608,446 B2 | 12/2013 | Pickens et al. | |
| 8,651,820 B2 | 2/2014 | Krikunov et al. | |
| 8,662,826 B2 | 3/2014 | Willett, Jr. et al. | |
| 8,727,730 B2 | 5/2014 | Liotta et al. | |
| 8,840,374 B2 | 9/2014 | Garcia-Crespo et al. | |
| 8,894,372 B2 | 11/2014 | Willett, Jr. et al. | |
| 8,905,716 B2 | 12/2014 | Boyington | |
| 9,057,278 B2 | 6/2015 | Howes et al. | |
| 9,328,622 B2 | 5/2016 | Garcia-Crespo et al. | |
| 9,453,422 B2 | 9/2016 | Hile et al. | |
| 9,840,931 B2 | 12/2017 | Joshi et al. | |
| 9,920,636 B2 | 3/2018 | Brandl | |
| 10,060,277 B2 * | 8/2018 | Engel | F01D 5/284 |
| 2003/0002987 A1 * | 1/2003 | Davidson | F01D 5/30 416/198 A |
| 2007/0014667 A1 | 1/2007 | Pickens et al. | |
| 2009/0116953 A1 * | 5/2009 | Spangler | F01D 5/081 415/115 |
| 2010/0166562 A1 * | 7/2010 | Boyer | F01D 5/3007 416/219 R |
| 2010/0247319 A1 * | 9/2010 | Slepski | F01D 5/141 416/223 A |
| 2012/0060721 A1 * | 3/2012 | Kool | C23C 10/18 106/14.21 |
| 2012/0275920 A1 * | 11/2012 | Delvaux | F01D 5/3015 416/204 R |
| 2013/0064668 A1 * | 3/2013 | Paige, II | F01D 5/284 416/219 R |
| 2013/0094968 A1 * | 4/2013 | Garcia-Crespo | F01D 5/3007 416/219 R |
| 2013/0149158 A1 | 6/2013 | Aiello et al. | |
| 2014/0154073 A1 * | 6/2014 | Cairo | F01D 5/282 416/1 |
| 2016/0025012 A1 * | 1/2016 | Bird | B23B 49/00 29/889.1 |
| 2016/0130957 A1 * | 5/2016 | Freeman | F01D 5/3061 416/193 R |
| 2016/0146021 A1 * | 5/2016 | Freeman | F01D 5/284 416/95 |
| 2016/0177748 A1 * | 6/2016 | Walston | F01D 5/303 416/220 R |
| 2016/0305260 A1 * | 10/2016 | Freeman | F01D 5/3007 |
| 2016/0312629 A1 * | 10/2016 | Evans | F01D 5/3007 |
| 2017/0107999 A1 * | 4/2017 | Fanton | B23P 15/006 |
| 2017/0167265 A1 * | 6/2017 | Fandrei, II | C22C 38/54 |
| 2017/0175557 A1 * | 6/2017 | Chouhan | F01D 11/001 |
| 2018/0135436 A1 * | 5/2018 | Berdou | D03D 25/005 |
| 2018/0149026 A1 | 5/2018 | Vetters et al. | |
| 2018/0230841 A1 * | 8/2018 | Itzel | F01D 11/122 |
| 2018/0283188 A1 * | 10/2018 | Jang | F01D 5/3061 |
| 2019/0153958 A1 * | 5/2019 | Kubiak | F01D 5/3007 |
| 2019/0338657 A1 * | 11/2019 | Freeman | F01D 5/3084 |

* cited by examiner

TURBINE BLADE ASSEMBLY WITH CERAMIC MATRIX COMPOSITE COMPONENTS

FIELD OF THE DISCLOSURE

The present disclosure relates generally to gas turbine engines, and more specifically to wheel assemblies for use in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

To withstand heat from the combustion products received from the combustor, the turbine may include turbine wheels having blades that comprise composite materials adapted to interact with the hot combustion products. In some turbine wheels, the blades may be coupled to a disk that supports the blades in a gas path of the engine. Coupling the composite blades with disks, for example, metallic disks, can present design challenges.

SUMMARY

The present disclosure may comprise one or more of the following features and combinations thereof.

A wheel assembly for a gas turbine engine may include a multi-piece disk and a blade. The multi-piece disk may be adapted to rotate about an axis during use of the gas turbine engine. The multi-piece disk may include a fore-disk segment and an aft-disk segment located axially aft of the fore-disk segment to define a dovetail shaped blade-receiver channel that extends circumferentially around the axis. The blade may be adapted to interact with gases during use of the gas turbine engine. The blade may include a root and an airfoil that extends radially away from the root. The root may have a dovetail shaped portion when viewed circumferentially relative to the axis and may be located in the dovetail shaped blade-receiver channel.

In some embodiments, the fore-disk segment may include a fore body and a fore band arranged circumferentially around the fore body. The aft-disk segment may include an aft body and an aft band arranged circumferentially around the aft body. The aft-facing engagement surface included in the fore band of the fore-disk segment and a forward-facing engagement surface included in the aft band of the aft-disk segment may cooperate to block the root of the blade from exiting the blade-receiver channel at any orientation of the blade relative to the axis.

In some embodiments, the wheel assembly may further include a platform that includes an outer radial wall, a fore wall, and an aft wall. The outer radial wall may be arranged partway about the blade to define a boundary of a flow path of the gases. The fore wall may extend radially inward relative to the outer radial wall. The aft wall may extend radially inward relative to the outer radial wall. The aft wall may be spaced apart axially from the fore wall to define a dovetail shaped passage when viewed circumferentially. At least a portion of the root of the blade may be located in the dovetail shaped passage.

In some embodiments, the platform further includes a support wall. The support wall may extend axially between and interconnect the fore wall and the aft wall.

In some embodiments, the fore wall and the aft wall may be located in the blade-receiver channel defined by the multi-piece disk. The fore wall may engage the fore-disk segment and the aft wall may engage the aft-disk segment.

In some embodiments, the wheel assembly may further include a platform that includes an outer radial wall and a rib. The outer radial wall may be arranged around at least a portion of the blade to define a boundary of a flow path of the gases. The rib may extend radially inward from the outer radial wall. The rib may be located in the blade-receiver channel. A portion of the rib may be dovetail shaped when viewed circumferentially.

In some embodiments, the root of the blade has a first side face and a second side face spaced apart circumferentially from the first side face. The rib of the platform has a first side face and a second side face spaced apart circumferentially from the first side face of the rib. The second side face of the rib may engage directly the first side face of the of the root of the blade.

In some embodiments, the root of the blade may include a stem and an attachment feature that extends radially inward from the stem of the root and engages the fore-disk segment and the aft-disk segment. The rib of the platform may include a stem and an attachment feature that extends radially inward from the stem of the rib. The attachment feature of the root and the attachment feature of the rib may have substantially similar profiles when viewed circumferentially. In some embodiments, the attachment feature of the root and the attachment feature of the rib are substantially the same shape and size.

In some embodiments, the outer radial wall of the platform may include a first edge and a second edge spaced apart circumferentially from the first edge. The rib may be spaced apart circumferentially from the first edge and the second edge.

In some embodiments, the outer radial wall of the platform may include a panel, a fore wing, and an aft wing. The panel may be arranged partway around the blade. The fore wing may extend axially forward away from the panel toward a front of the fore-disk segment. The aft wing may extend axially aft away from the panel toward a rear of the aft-disk segment. The rib of the platform may include a stem and an attachment feature that extends radially inward from the stem. The stem of the rib may extend axially along the fore wing, the panel, and the aft wing. The attachment feature of the platform may be located in the blade-receiver channel.

In some embodiments, the rib of the platform may include a stem and an attachment feature that extends radially relative to the stem. The platform may further include a support strut that extends axially into the fore-disk segment and the aft-disk segment. The support strut may be located radially between the outer radial wall and the attachment feature of the rib. The support strut may extend circumferentially beyond the attachment feature of the rib.

According to an aspect of the present disclosure, a wheel assembly may include a disk and a blade. The disk may be formed to define a blade-receiver channel that extends circumferentially completely around the axis. The blade may comprise ceramic materials and may include a root located in the blade-receiver channel and an airfoil that extends radially away from the root. The root may include a stem coupled with the airfoil and a circumferentially extending attachment feature located in the blade-receiver channel.

In some embodiments, the wheel assembly may further include a platform that includes an outer radial wall, a fore wall, and an aft wall. The outer radial wall may be arranged partway about the blade to define a gas flow path. The fore wall may extend radially inward relative to the outer radial wall. The aft wall may extend radially inward relative to the outer radial wall. The aft wall may be spaced apart axially from the fore wall to define a dovetail shaped passage that receives at least a portion of the root of the blade.

In some embodiments, the platform may further include a support wall. The support wall may extend axially between and interconnects the fore wall and the aft wall. In some embodiments, the fore wall of the platform may be offset circumferentially relative to the aft wall of the platform.

A method in accordance with the present disclosure may include a number of steps. The method may include providing a multi-piece disk having a first-disk segment and a second-disk segment and a blade that includes a root and an airfoil that extends radially away from the root relative to an axis, the root being dovetail shaped when viewed circumferentially relative to the axis, locating the root of the blade in a circumferentially extending passage formed in the first-disk segment, and moving the second-disk segment toward the first-disk segment to locate the root of the blade in a circumferentially extending passage formed in the second-disk segment.

In some embodiments, the method may further include providing a platform having an outer radial wall, a fore wall that extends radially, and an aft wall that extends radially. The aft wall may be spaced apart axially from the fore wall to provide a dovetail-shaped passage therebetween. The method may include moving the platform relative to the blade to receive the root of the blade in the dovetail-shaped passage.

In some embodiments, the method may include engaging directly the first-disk segment with the fore wall of the platform and the second-disk segment with the aft wall of the platform. The method may include blocking relative axial movement between the first-disk segment and the second-disk segment.

In some embodiments, the method may include providing a platform having an outer radial wall and a rib that extends radially inward away from the outer radial wall. The rib may have a dovetail shaped portion when viewed circumferentially. The method may further include locating the rib in the circumferentially extending passage formed in the first-disk segment before the moving step. In some embodiments, the method may include engaging directly the rib of the platform with the root of the blade.

These and other features of the present disclosure will become more apparent from the following description of the illustrative embodiments.

DETAILED DESCRIPTION OF THE DRAWINGS

Figure 1:
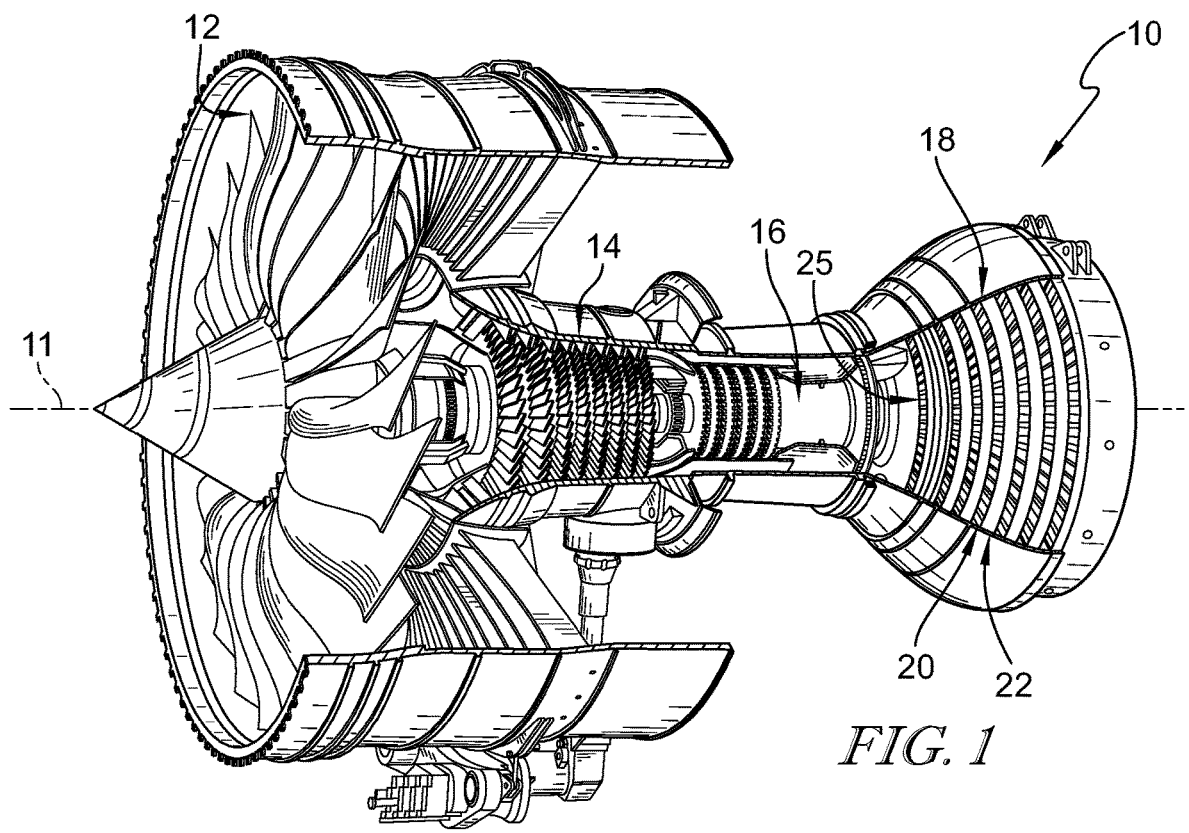
FIG. 1 is a cutaway view of a gas turbine engine that includes a fan, a compressor, a combustor, and a turbine that includes a plurality of turbine wheel assemblies in accordance with the present disclosure that are adapted to extract work from hot combustion products received from the combustor.

For the purposes of promoting an understanding of the principles of the disclosure, reference will now be made to a number of illustrative embodiments illustrated in the drawings and specific language will be used to describe the same.

Figure 2:
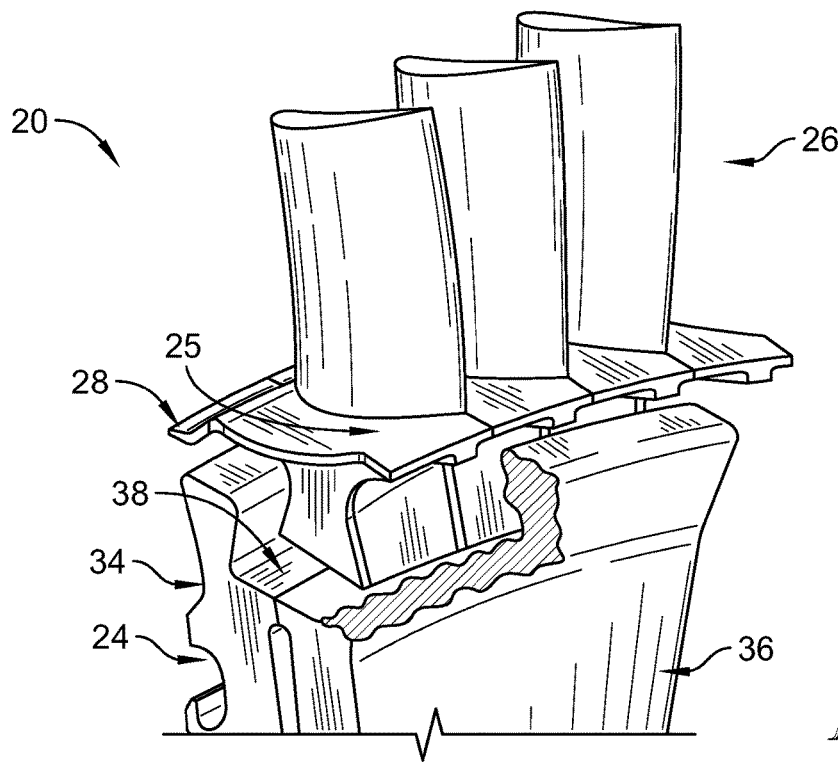
FIG. 2 is a perspective view of a portion of one of the turbine wheel assemblies included in the gas turbine engine of FIG. 1 showing that the turbine wheel assembly includes a multi-piece disk that defines a circumferentially extending channel, a plurality of blades having circumferentially extending roots located in the channel, and a plurality of platforms located between the blades.

A wheel assembly 20 for adapted for use with a gas turbine engine 10 includes a disk 24 and a plurality of blades 26 as shown in FIGS. 1 and 2. The disk 24 is adapted to retain the blades 26 and to rotate about a center axis 11 during operation of the gas turbine engine 10. The blades 26 each include a circumferentially extending roots 60 received in the disk 24 and an airfoil 62 that extends radially away from the root 60 to interact with gases flowing through the gas turbine engine 10.

The disk 24 is formed to define a circumferentially extending blade-receiver channel 38 as shown in FIG. 2. The roots 60 of the blades 26 have circumferentially extending attachment features 66 that are located in the blade-receiver channel 38 of the disk 24 to couple the blades 26 with the disk 24. In illustrative embodiments, the wheel assembly 20 further includes a plurality of platforms 28 that define a boundary of a flow path 25 of the gases and that have circumferentially extending attachment features 88 received in the blade-receiver channel 38 to couple the platforms 28 with the disk 24. Illustratively, the attachment features 66 of the blades 26 and the attachment features 88 of the platforms 28 are dovetail shaped when viewed circumferentially relative to the axis 11. In other embodiments, the attachment features 66, 88 may have other shapes when viewed circumferentially.

Illustratively, the blades 26 comprise ceramic matrix composite materials. Providing ceramic matrix composite blades 26 with attachment features 66 that extend circumferentially may allow the attachment feature 66 to be larger/thicker relative to typical metallic blades and may reduce the stress acting on the attachment feature 66. In illustrative embodiments, the platforms 28 are separate components from the blades 26 and are incorporated as an offloaded part. As a result, the blade attachments 66 may not support the centrifugal load associated with the platforms 28. The platforms 28 comprise ceramic matrix composite materials in the illustrative embodiment. In other embodiments, the blades 26 and/or the platforms 28 comprise metallic, monolithic ceramic, or composite materials.

The wheel assembly 20 is incorporated in the gas turbine engine 10 which includes a fan 12, a compressor 14, a combustor 16, and a turbine 18 as shown in FIG. 1. The fan 12 generates thrust for propelling an aircraft. The compressor 14 compresses and delivers air to the combustor 16. The combustor 16 mixes fuel with the compressed air received from the compressor 14 and ignites the fuel. The hot, high-pressure gases from the burning fuel are directed into the turbine 18 where the turbine 18 extracts work from the gases to drive the compressor 14 and the fan 12. In other embodiments, the gas turbine engine 10 may include a shaft, turboprop, or gearbox in place of the fan 12.

The turbine 18 includes a plurality of turbine wheel assemblies 20 and turbine vane assemblies 22 as suggested in FIG. 1. A portion of one of the turbine wheel assemblies 20 is shown in FIG. 2. Each turbine wheel assembly 20 is configured to interact with the hot combustion gases from the combustor 16 and rotate about the center axis 11 of the gas turbine engine 10 to generate power for driving the compressor 14 and the fan 12. A turbine vane assembly 22 is located between neighboring turbine wheel assemblies 20 to direct gases received from an upstream turbine wheel assembly 20 toward a downstream turbine wheel assembly 20.

The turbine wheel assembly 20 of FIG. 2 includes the disk 24, the plurality of blades 26, and the plurality of platforms 28. The disk 24 is coupled to a shaft of the gas turbine engine 10 and is configured to rotate the shaft about the center axis 11 during operation of the gas turbine engine 10 to generate power. The plurality of blades 26 are shaped to interact with and be rotated by the hot gases that move axially along the flow path 25 of the gas turbine engine 10. The platforms 28 are located between blades 26 and are arranged circumferentially about the disk 24 to form the boundary of the flow path 25 of the gas turbine engine 10.

Figure 3:
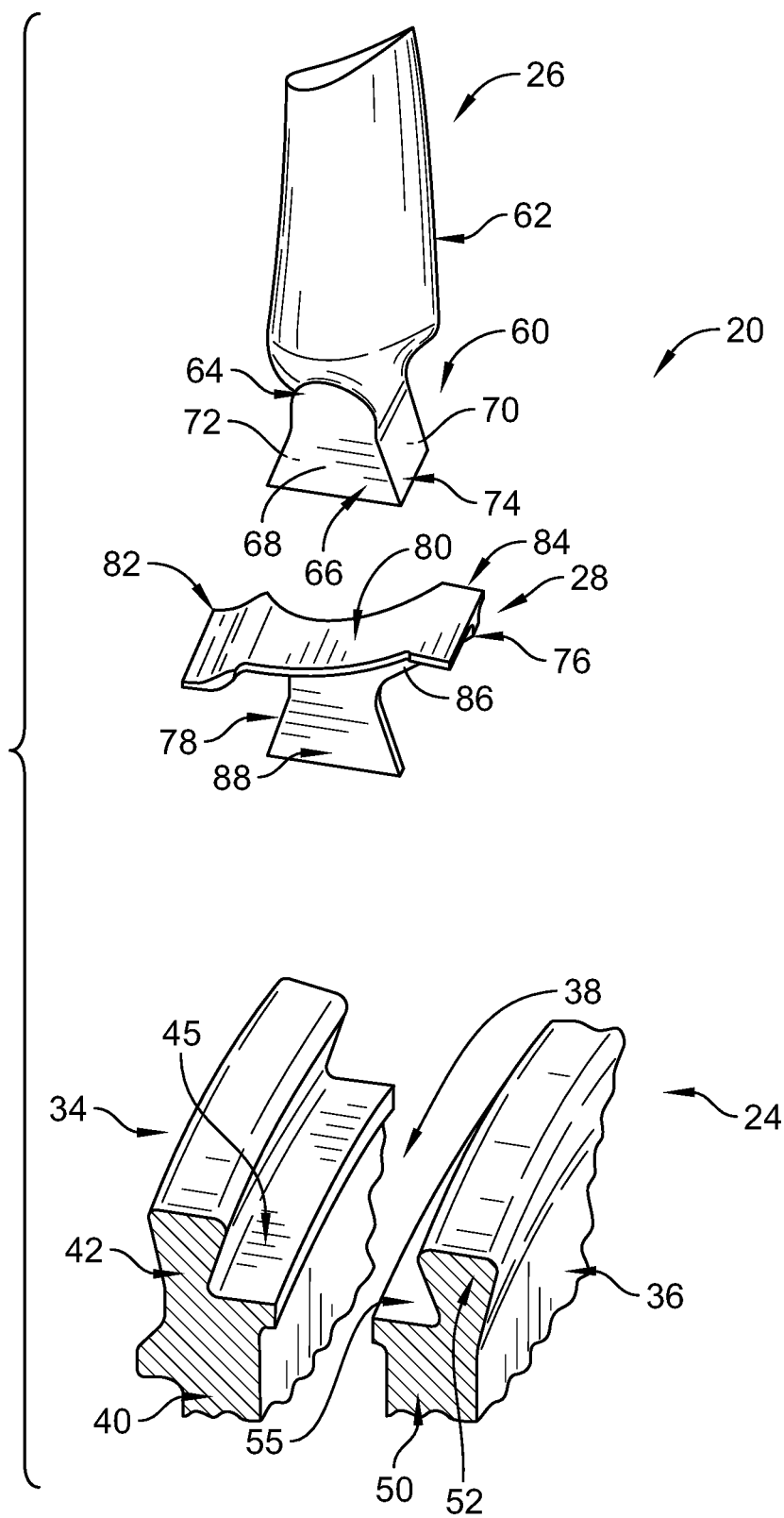
FIG. 3 is an exploded view of the turbine wheel assembly of FIG. 2 showing the disk that includes a fore-disk segment and an aft-disk segment, the plurality of platforms having dovetail shaped ribs, and the plurality of blades having circumferentially extending dovetail shaped roots.

The disk 24 is illustratively a multi-piece disk 24 that includes a fore-disk segment 34 and an aft-disk segment 36 as shown in FIGS. 2 and 3. The aft-disk segment 36 is located axially aft of the fore-disk segment 34 to define a blade-receiver channel 38 between the fore-disk segment 34 and the aft-disk segment 36. The blade-receiver channel 38 extends circumferentially around the axis 11 and is sized to receive a portion of the blades 26 and the platforms 28. In the illustrative embodiment, the blade-receiver channel 38 is dovetail shaped when viewed circumferentially. The fore-disk segment 34 and the aft-disk segment 36 are made of metallic materials in the illustrative embodiment.

In other embodiments, the disk 24 is a unitary one-piece component. In some embodiments, the fore-disk segment 34 and the aft-disk segment are integrally formed. In embodiments, with a one-piece disk, the roots of the blades may be formed to allow the blades to be inserted and removed from the blade-receiver channel by orienting the blade relative to the disk.

Figure 4:
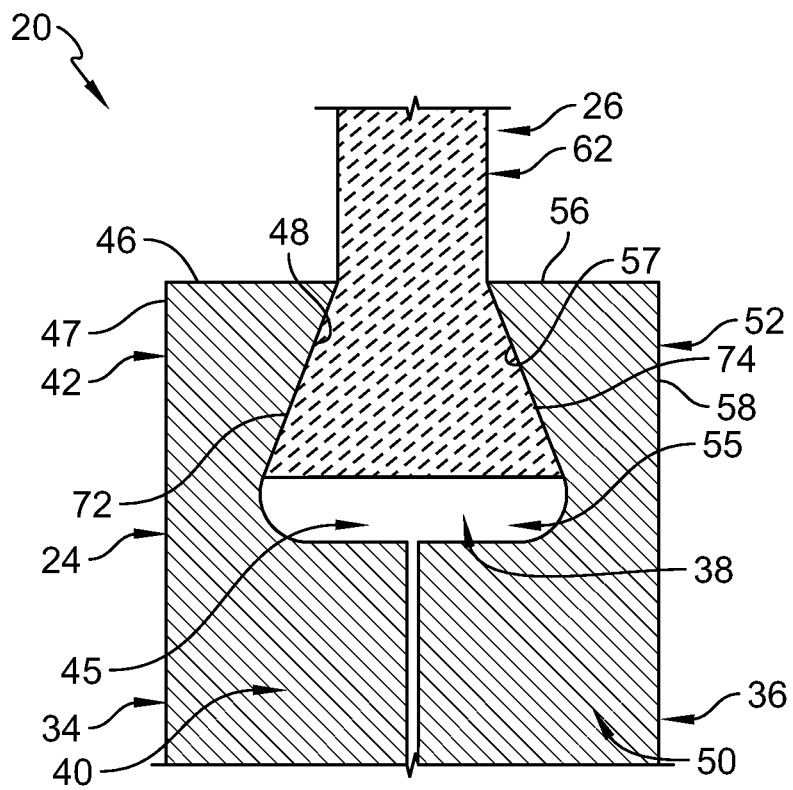
FIG. 4 is a diagrammatic and section view of the turbine wheel assembly showing the fore-disk segment adjacent the aft-disk segment to define the channel therebetween and the circumferentially extending dovetail shaped root of the blade located in the channel such that the blade is blocked from radial movement out of the channel.

The fore-disk segment 34 includes a fore body 40 and a fore band 42 that extends circumferentially around the fore body 40 as shown in FIGS. 2-4. The fore body 40 is configured to couple with the shaft of the gas turbine engine 10 to transmit power to the shaft. The fore band 42 extends radially away from the fore body 40 and cooperates with the fore body 40 to define a circumferentially extending passage 45 that forms a portion of the blade-receiver channel 38 as shown in FIG. 4.

The fore band 42 includes an outer radial surface 46, a fore-facing surface 47, and an aft-facing engagement surface 48 as shown in FIG. 4. The aft-facing engagement surface 48 extends from the outer radial surface 46 toward the fore body 40. The aft-facing engagement surface 48 is shaped to mate with the attachment feature 66 included in the roots 60 of the blades 26. Illustratively, the outer radial surface 46, the fore-facing surface 47, and the aft-facing engagement surface 48 are continuous such that the roots 60 of the blades 26 are blocked from moving axially or radially out of the blade-receiver channel 38. In other words, the outer radial surface 46, the fore-facing surface 47, and the aft-facing engagement surface 48 are formed without holes or slots that would allow the blades 26 to pass through without moving the disk segments 34, 36 apart from each other.

The aft-disk segment 36 includes an aft body 50 and an aft band 52 that extends circumferentially around the aft body 50 as shown in FIGS. 2-4. The aft body 50 is configured to couple with the shaft of the gas turbine engine 10 to transmit power to the shaft. The aft band 52 extends radially away from the aft body 50 and cooperates with the aft body 50 to define a circumferentially extending passage 55 that forms a portion of the blade-receiver channel 38 as shown in FIG. 4. The aft-disk segment 36 and the fore-disk segment 34 are blocked from moving axially relative to each other and are coupled to rotate with one another.

The aft band 52 includes an outer radial surface 56, a fore-facing engagement surface 57, and an aft-facing surface 58 as shown in FIG. 4. The fore-facing engagement surface 57 extends from the outer radial surface 56 toward the aft body 50. The fore-facing engagement surface 57 is shaped to mate with the attachment portions 66 of the roots 60 of the blades 26. Illustratively, the outer radial surface 56, the fore-facing engagement surface 57, and the aft-facing surface 58 are continuous such that the roots 60 of the blades 26 are blocked from moving axially or radially out of the blade-receiver channel 38. In other words, the outer radial surface 56, the fore-facing engagement surface 57, and the aft-facing surface 58 are formed without holes or slots sized that would allow the blades 26 to pass through without moving the disk segments 34, 36 apart from each other.

Illustratively, the blade-receiver channel 38 is dovetail shaped when viewed circumferentially relative to the axis 11 as shown in FIG. 4. In other embodiments, the blade-receiver channel 38 is an alternative shape such as, for example, fir tree shape when viewed circumferentially. The blade-receiver channel 38 extends circumferentially and blocks radial movement of the blades 26 and platforms 28 out of the blade-receiver channel 38. The aft-facing engagement surface 48 included in the fore band 42 and the fore-facing engagement surface 57 included in the aft band 44 cooperate to block the roots 60 of the blades 26 from exiting the blade-receiver channel 38 at any orientation of the blades 26 relative to the axis 11. For example, the blades 26 are blocked at all circumferential locations about the axis 11 and are blocked if the blades 26 are tilted or angled relative to the disk segments 34, 36. As a result, the fore-disk segment 34 is moved axially relative to the aft-disk segment 36 to insert or remove blades 26 during assembly of the turbine wheel assembly 20. In some embodiments, the roots 60 of the blades 26 are clamped by the disk segments 34, 36.

Figure 5:
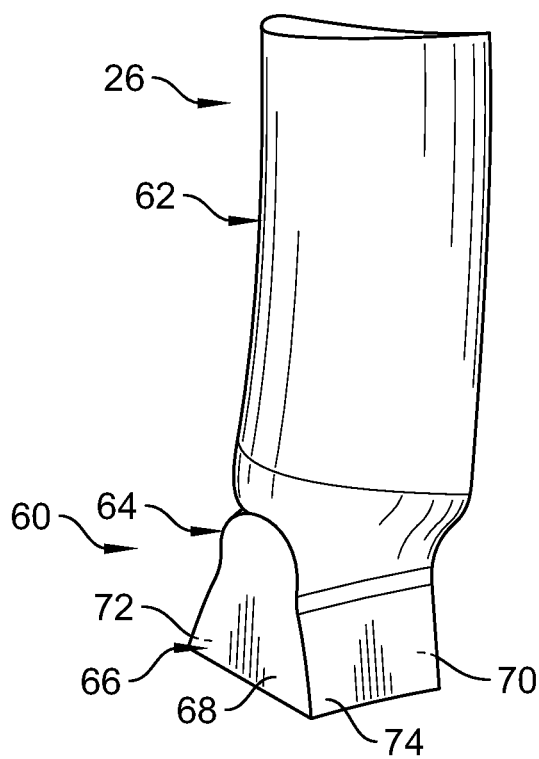
FIG. 5 is a perspective view of one of the blades of the turbine wheel assembly of FIG. 2 showing that the root of the blade is dovetail shaped when viewed circumferentially.

Each blade 26 includes the root 60 and the airfoil 62 that extends radially away from the root 60 relative to the center axis 11 as suggested in FIGS. 3 and 5. The root 60 of each blade 26 is received in the blade-receiver channel 38 to couple the blades 26 to the disk 24 for rotation with the disk 24. The airfoils 62 are shaped to be pushed circumferentially by the hot gases moving in the flow path 25 to cause the turbine wheel assembly 20 to rotate about the center axis 11 during operation of the gas turbine engine 10.

The root 60 of each blade 26 includes a stem 64 coupled with the airfoil 62 and an attachment feature 66 coupled with the stem 64 as shown in FIG. 5. The attachment feature 66 of the blade 26 is illustratively dovetail shaped when viewed circumferentially relative to the axis 11. The attachment feature 66 includes a first side face 68, a second side face 70 spaced apart circumferentially from the first side face 68, a fore engagement face 72, and an aft engagement face 74 spaced apart axially from the fore engagement face 72 as shown in FIGS. 4 and 5. The first side face 68 and the second side face 70 extend between and interconnect the fore engagement face 72 and the aft engagement face 74. The first side face 68 and the second side face 70 are planar in the illustrative embodiment.

The fore engagement face 72 engages directly the aft-facing engagement surface 48 of the fore-disk segment 34 as shown in FIG. 4. The aft engagement face 74 engages directly the fore-facing engagement surface 57 of the aft-disk segment 36. The fore engagement face 72 and the aft-facing engagement surface 48 of the fore-disk segment 34 have complementary shapes. The aft engagement face 74 and the fore-facing engagement surface 57 of the aft-disk segment 36 have complementary shapes.

Illustratively, the root 60 and the airfoil 62 of each blade 26 are integrally formed such that each blade 26 is a one-piece integral component. The blades 26 comprise ceramic matrix composite materials in some embodiments. The blade 26 comprises only ceramic matrix composite materials in the illustrative embodiment. In other embodiments, the blades 26 may comprise one or more of ceramic matrix composite materials, composite materials, and metallic materials.

Figure 6:
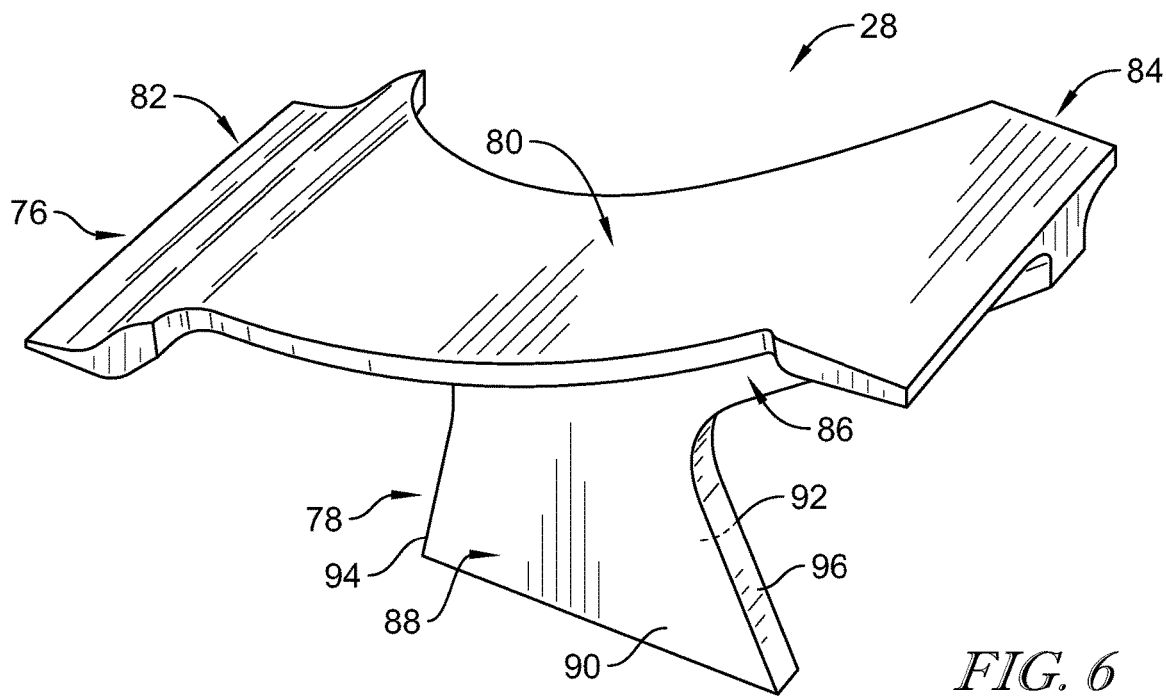
FIG. 6 is a top perspective view of one of the platforms included in the turbine wheel assembly of FIG. 2 showing that the platform includes an outer radial wall that defines a portion of a flow path of gas conducted through the gas turbine engine and the dovetail shaped rib that extends radially inward from the platform.
Figure 7:
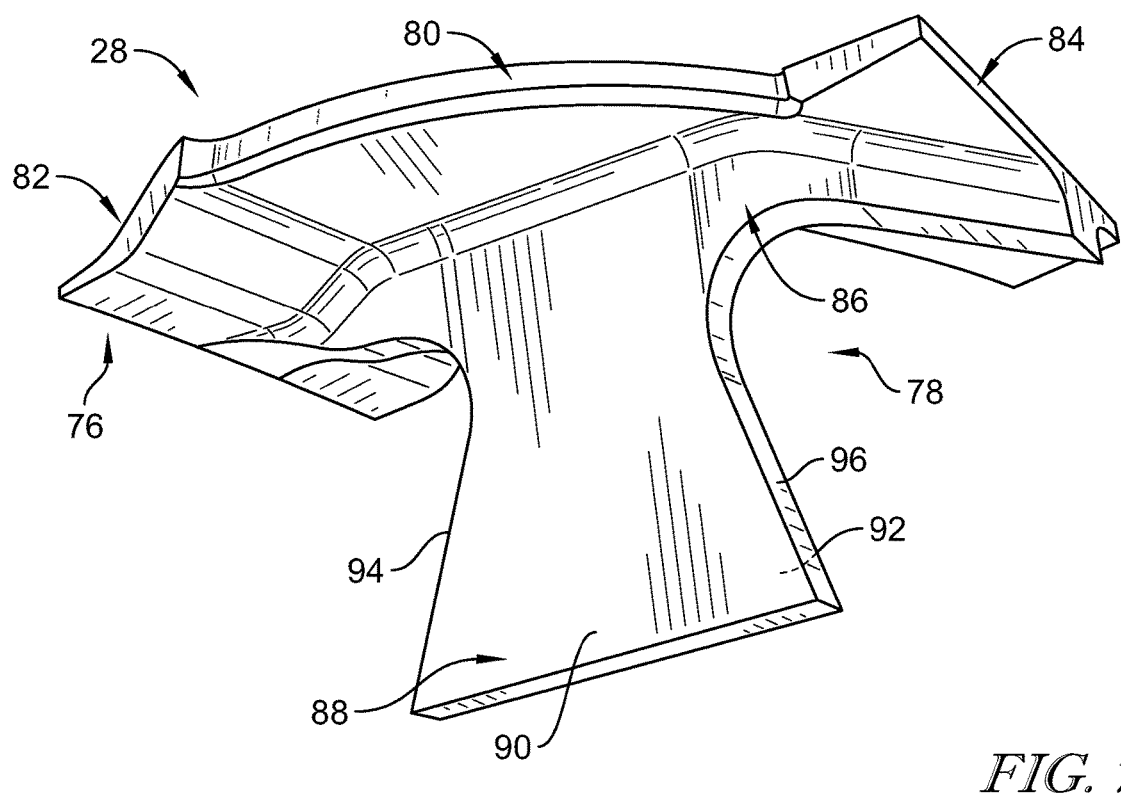
FIG. 7 is a bottom perspective view of the platform of FIG. 6 showing that the rib includes an axially extending stem couple to an inner side of the outer radial wall and a dovetail shaped attachment feature that extends from the stem.

The platforms 28 include the outer radial wall 76 and the rib 78 as shown in FIGS. 6 and 7. The outer radial wall 76 is arranged partway around the blade 26 to define the boundary of the flow path 25 of the gases. The rib 78 extends radially inward from the outer radial wall 76 and is located in the blade-receiver channel 38 to couple the platform 28 with the disk 24. The outer radial wall 76 of the platform 28 includes a first edge and a second edge spaced apart circumferentially from the first edge and the rib 78 is spaced apart circumferentially from the first and second edges of the outer radial wall 76.

The outer radial wall 76 of the platform 28 includes a panel 80, a fore wing 82, and an aft wing 84 as shown in FIGS. 6 and 7. The panel 80 is configured to be arranged partway around the blades 26. The fore wing 82 extends axially forward away from the panel 80 toward a front of the fore-disk segment 34. The aft wing 84 extends axially aft away from the panel 80 toward a rear of the aft-disk segment 36. The fore wing 82 and the aft wing 84 may engage portions of the turbine vane assemblies 22 located fore and aft of the turbine wheel assembly 20.

The rib 78 includes a stem 86 and an attachment feature 88 as shown in FIG. 7. The stem 86 extends axially along an inner surface of the fore wing 82, the panel 80, and the aft wing 84 to provide support for the fore wing 82 and aft wing 84. The attachment feature 88 is located in the blade-receiver channel to couple the platform 28 with the disk 24.

The attachment feature 88 of the platform 28 is dovetail shaped when viewed circumferentially as shown in FIG. 6. The attachment feature 66 included in the root 60 of the blade 26 and the attachment feature 88 included in the rib 78 of the platform have substantially similar profiles when viewed circumferentially as shown in FIGS. 2, 5 and 7.

The attachment feature 88 has a first side face 90 and a second side face 92 spaced apart circumferentially from the first side face 90. The second side face 92 of the attachment feature 66 of the platform 28 engages directly the first side face 68 of the blade 26. A second side face 70 of a neighboring blade 26 engages directly the first side face 90 of the platform. The attachment feature 88 further includes a fore engagement surface 94 and an aft engagement surface 96 spaced apart from the fore engagement surface 94. The fore engagement surface 94 and the aft engagement surface 96 extend between and interconnect the first and second side surfaces 90, 92. The fore engagement surface 94 engages directly the aft-facing engagement surface 48 of the disk 24 and the aft engagement surface 96 engages directly the fore-facing engagement surface 57 of the disk 24.

Illustratively, the outer radial wall 76 and the rib 78 are integrally formed such that each platform 28 is a one-piece integral component. The platforms 28 comprise ceramic matrix composite materials in some embodiments. The platforms 28 comprise only ceramic matrix composite materials in the illustrative embodiment. In other embodiments, the platforms 28 may comprise one or more of ceramic matrix composite materials, composite materials, and metallic materials.

Illustratively, the attachment features 66, 88 are dovetail shaped when viewed circumferentially. In other embodiments, the blades 26 and the platforms 28 may have other shaped attachment features 66, 88 when viewed circumferentially relative to the axis 11 such as, for example, fir tree shape. In other embodiments, individual or combinations of features of the disk 24, the blades 26, and the platforms 28 may be incorporated into other wheel assemblies such as, for example, compressor wheel assemblies.

A method of assembling the turbine wheel assembly 20 may comprise a plurality of steps. The method includes providing the multi-piece disk 24 and one of the blades 26. The method includes locating the root 60 of the blade 26 in the circumferentially extending passage formed in the first-disk segment. The method includes moving the second-disk segment toward the first disk segment to locate the root 60 of the blade 26 in a circumferentially extending passage formed in the second-disk segment. The method may include engaging directly the first-disk segment and the second disk segment with the root 60 of the blade 26 and blocking relative axial movement between the first-disk segment and the second-disk segment after the moving step.

The method may further include providing one of the platforms 328 having the outer radial wall 376, the fore wall 377 that extends radially, and the aft wall 379 that extends radially. The method includes moving the platform 328 relative to the blade 326 to receive the root 360 of the blade 326 in the dovetail-shaped passage defined by the platform 328. The method may include engaging directly the first-disk segment with the fore wall 377 of the platform 328 and the second disk segment with aft wall 379 of the platform 328 and blocking relative axial movement between the first-disk segment and the second-disk segment.

The method may include providing a platform 28 having the outer radial wall 76 and the rib 78 that extends radially inward away from the outer radial wall 76. The method may include locating the rib 78 in the circumferentially extending passage formed in the first-disk segment before the moving step.

Figure 8:
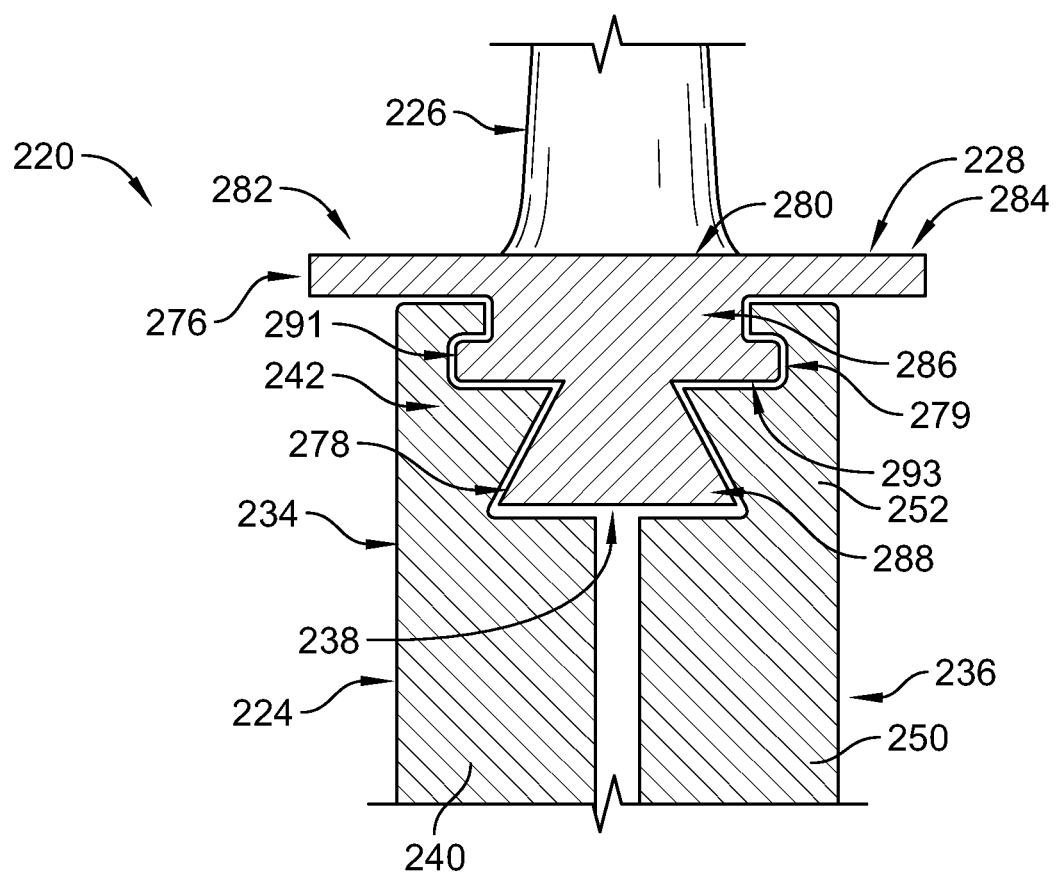
FIG. 8 is a diagrammatic and section view of another embodiment of turbine wheel assembly adapted for use in the gas turbine engine of FIG. 1 showing that the platform further includes a support strut located radially between the outer radial wall and the dovetail shaped attachment feature of the platform and further showing that the support strut extends into the disk to block radial movement of the platform.
Figure 9:
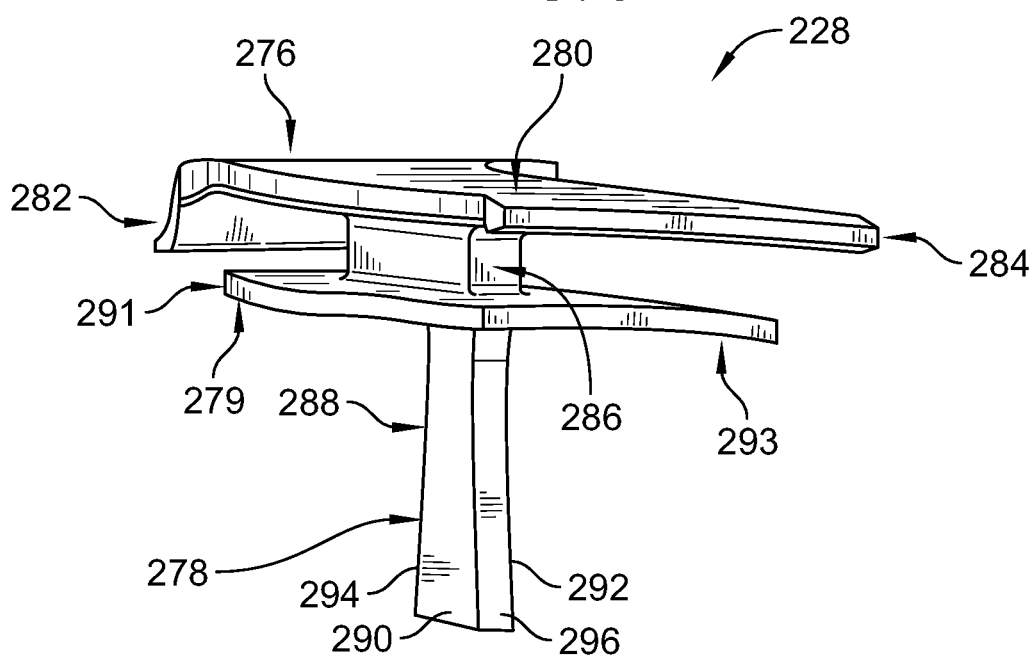
FIG. 9 is a perspective view of the platform included in the turbine wheel assembly of FIG. 8 showing the outer radial wall, the support strut, and the attachment feature.

Another embodiment of a turbine wheel assembly 220 in accordance with the present disclosure is shown in FIGS. 8 and 9. The turbine wheel assembly 220 is substantially similar to the turbine wheel assembly 20 shown in FIGS. 1-7 and described herein. Accordingly, similar reference numbers in the 200 series indicate features that are common between the turbine wheel assembly 20 and the turbine wheel assembly 220. The description of the turbine wheel assembly 20 is incorporated by reference to apply to the turbine wheel assembly 220, except in instances when it conflicts with the specific description and the drawings of the turbine wheel assembly 220.

The turbine wheel assembly 220 includes a disk 224, a plurality of blades 226, and a plurality of platforms 228 as suggested in FIG. 8. The disk 224 includes a fore-disk segment 234 and an aft disk segment 236 that cooperate to define a circumferentially extending blade-receiver channel 238. The blades 226 and platforms 228 are received in the blade-receiver channel 238. Each platform 228 is formed to include a support strut 279 located radially between an outer radial wall 276 and an attachment feature 288 of the platform 228. The support strut 279 reinforces the platform 228 and may reduce deflection of wings 282, 284 during operation of the gas turbine engine 10.

The fore-disk segment 234 includes a fore body 240 and a fore band 242 that is arranged circumferentially around the fore body 240 as shown in FIG. 8. The fore band 242 is shaped to define a portion of the blade-receiver channel 238. The fore band 242 is formed to define a passage sized to receive the attachment feature 288 of the platform 228 and formed to define a region sized to receive a fore end 291 of the support strut 279 of the platform 228.

The aft-disk segment 236 includes an aft body 250 and an aft band 252 that is arranged circumferentially around the aft body 250 as shown in FIG. 8. The aft band 252 is shaped to define a portion of the blade-receiver channel 238. The aft band 252 is formed to define a passage sized to receive the attachment feature 288 of the platform 228 and formed to define a region sized to receive an aft end 293 of the support strut 279 of the platform 228.

Each platform 228 includes the outer radial wall 276, a rib 278, and the support strut 279 as shown in FIGS. 8 and 9. The outer radial wall 276 extends partway around neighboring blades 226. The rib 278 extends radially away from the outer radial wall 276 and is located in the blade-receiver channel 238 to couple the platform 228 with the disk 224. The support strut 279 extends outward away from the rib 278 and is received in the fore-disk segment 234 and the aft-disk segment 236.

The outer radial wall 276 includes a panel 280, a fore wing 282, and an aft wing 284 as shown in FIGS. 8 and 9. The rib 278 includes a stem 286 that extends radially inward from the panel 280 and the attachment feature 288. The support strut 279 is located radially between the outer radial wall 276 and the attachment feature 288 and forms a gap between the outer radial wall 276 and the support strut 279. The stem 286 of the rib 278 is located radially between the outer radial wall 276 and the support strut 279 in the illustrative embodiment.

The support strut 279 includes the fore end 291 and the aft end 293 that is spaced apart axially from the fore end 291 as shown in FIGS. 8 and 9. The fore end 291 extends axially into and interlocks with the fore-disk segment 234. The aft end 293 extends axially into and interlocks with the aft-disk segment 236. In the illustrative embodiment, the fore end 291 and the aft end 293 are rectangular shaped when viewed circumferentially. In other embodiments, the fore end 291 and the aft end 293 have alternative shapes such as, for example, dovetail, fir tree, and hook shaped. The support strut 279 extends circumferentially beyond the attachment feature 288 of the rib 278. That is, the support strut 279 has a greater circumferential width than the attachment feature 288.

The attachment feature 288 is located generally in a middle of the platform 228 circumferentially as shown in FIG. 9. The attachment feature 288 includes a first side face 290, a second side face 292 spaced apart circumferentially from the first side face 290, a fore engagement surface 294, and an aft engagement surface 296. The fore engagement surface 294 and the aft engagement surface 296 extend circumferentially between and interconnect the first side face 290 and the second side face 292.

Another embodiment of a turbine wheel assembly 320 in accordance with the present disclosure is shown in FIGS. 10-13. The turbine wheel assembly 320 is substantially similar to the turbine wheel assembly 20 shown in FIGS. 1-7 and described herein. Accordingly, similar reference numbers in the 300 series indicate features that are common between the turbine wheel assembly 20 and the turbine wheel assembly 320. The description of the turbine wheel assembly 20 is incorporated by reference to apply to the turbine wheel assembly 320, except in instances when it conflicts with the specific description and the drawings of the turbine wheel assembly 320.

Figure 10:
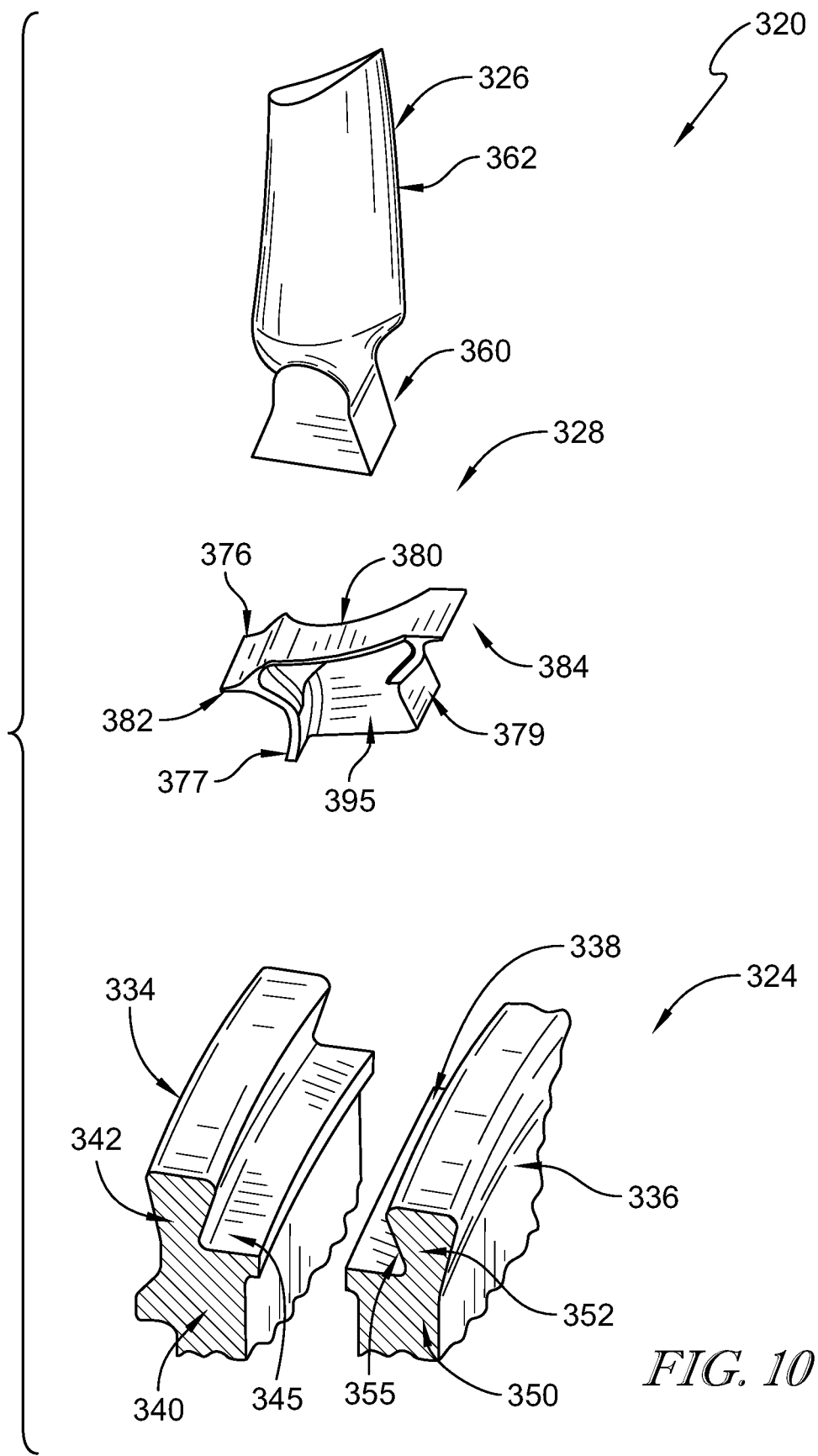
FIG. 10 is an exploded view of another embodiment of a turbine wheel assembly adapted for use in the gas turbine engine of FIG. 1.

The turbine wheel assembly 320 includes a multi-piece disk 324, a plurality of blades 326, and a plurality of platforms 328 as shown in FIG. 10. The disk 324 is coupled to a shaft of the gas turbine engine 10 and is configured to rotate the shaft about the center axis 11 during operation of the gas turbine engine 10 to generate power. The plurality of blades 326 are shaped to interact with and be rotated by the hot gases that move axially along the flow path 25 of the gas turbine engine 10. The platforms 328 are located around the blades 326 and are arranged circumferentially about the disk 324 to form the boundary of the flow path 25 of the gas turbine engine 10.

The disk 324 includes a fore-disk segment 334 and an aft-disk segment 336 as shown in FIG. 10. The aft-disk segment 336 is located axially aft of the fore-disk segment 334 to define a blade-receiver channel 338 between the fore-disk segment 334 and the aft-disk segment 336. The blade-receiver channel 338 extends circumferentially around the axis 11 and is sized to receive a portion of the blades 326 and the platforms 328. In the illustrative embodiment, the blade-receiver channel 338 is dovetail shaped when viewed circumferentially.

Figure 13:
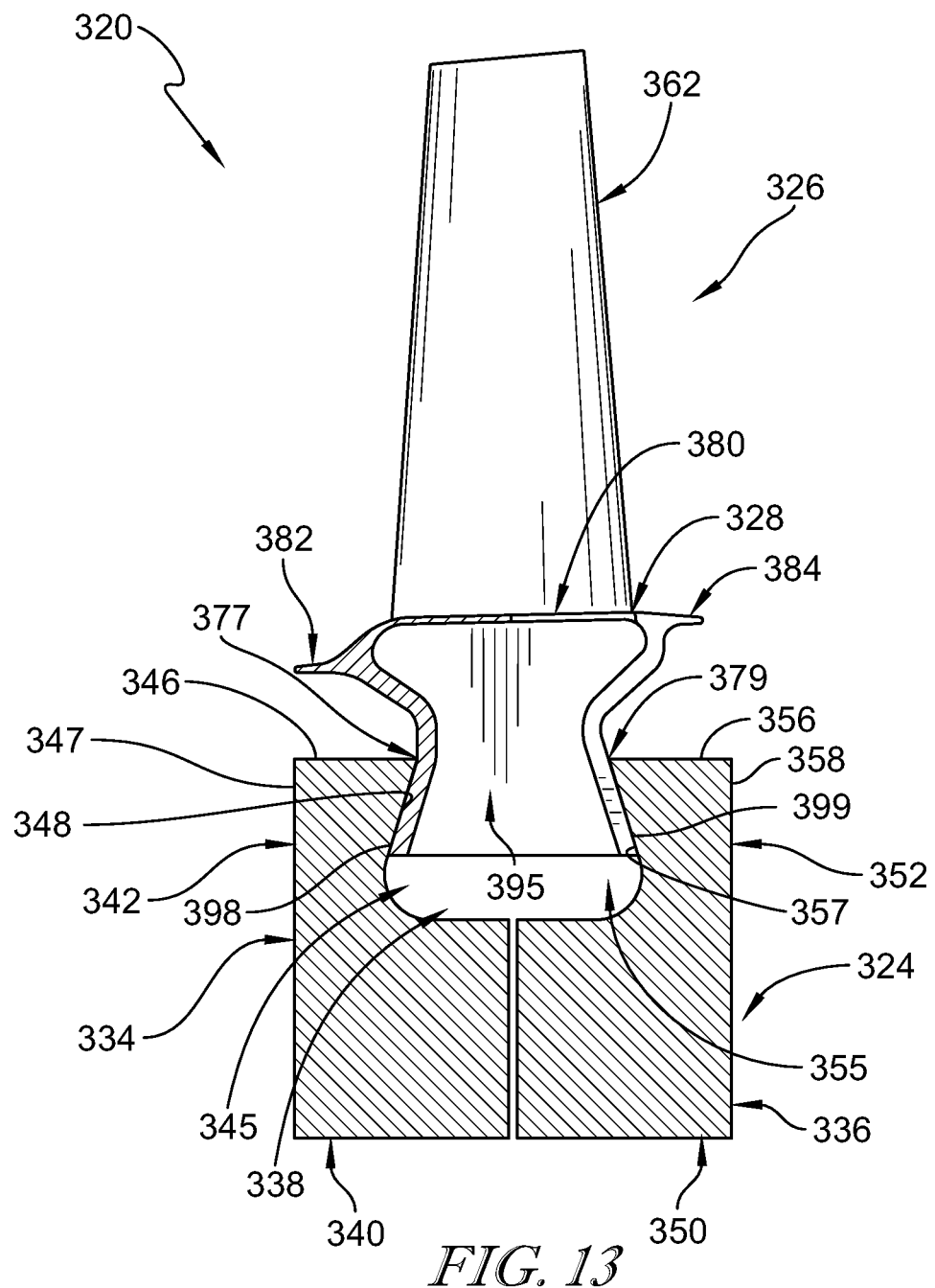
FIG. 13 is a section view of the turbine wheel assembly of FIG. 10 showing that the platform includes the outer radial wall, the fore wall, the aft wall that is spaced apart from the fore wall to define a dovetail shaped passage that receives a root of a blade, and the support wall that extends axially between the fore wall and the aft wall.

The fore-disk segment 334 includes a fore body 340 and a fore band 342 that extends circumferentially around the fore body 40 as shown in FIG. 13. The fore band 342 extends radially away from the fore body 340 and cooperates with the fore body 340 to define a circumferentially extending passage that forms a portion of the blade-receiver channel 338. The aft-disk segment 336 includes an aft body 350 and an aft band 352 that extends circumferentially around the aft body 350. The aft band 352 extends radially away from the aft body 350 and cooperates with the aft body 350 to define a circumferentially extending passage that forms a portion of the blade-receiver channel 338. The aft-disk segment 336 and the fore-disk segment 334 are blocked from moving axially relative to each other and are coupled to rotate with one another.

The fore band 342 includes an outer radial surface 346, a fore-facing surface 347, and an aft-facing engagement surface 348 as shown in FIG. 13. The aft-facing engagement surface 348 is shaped to mate with fore walls 377 included in the platforms 328. Illustratively, the outer radial surface 346, the fore-facing surface 347, and the aft-facing engagement surface 348 are continuous and are formed without holes or slots that would allow the blades 326 or platforms 328 to pass through without moving the disk segments relative to each other.

The aft band 352 includes an outer radial surface 356, a fore-facing engagement surface 357, and an aft-facing surface 358 as shown in FIG. 13. The fore-facing engagement surface 357 is shaped to mate with aft walls 379 included in the platforms 328. Illustratively, the outer radial surface 356, the fore-facing engagement surface 357, and the aft-facing surface 358 are continuous and formed without holes or slots sized that would allow the blades 326 or platforms 328 to pass through without moving the disk segments relative to each other.

Figure 11:
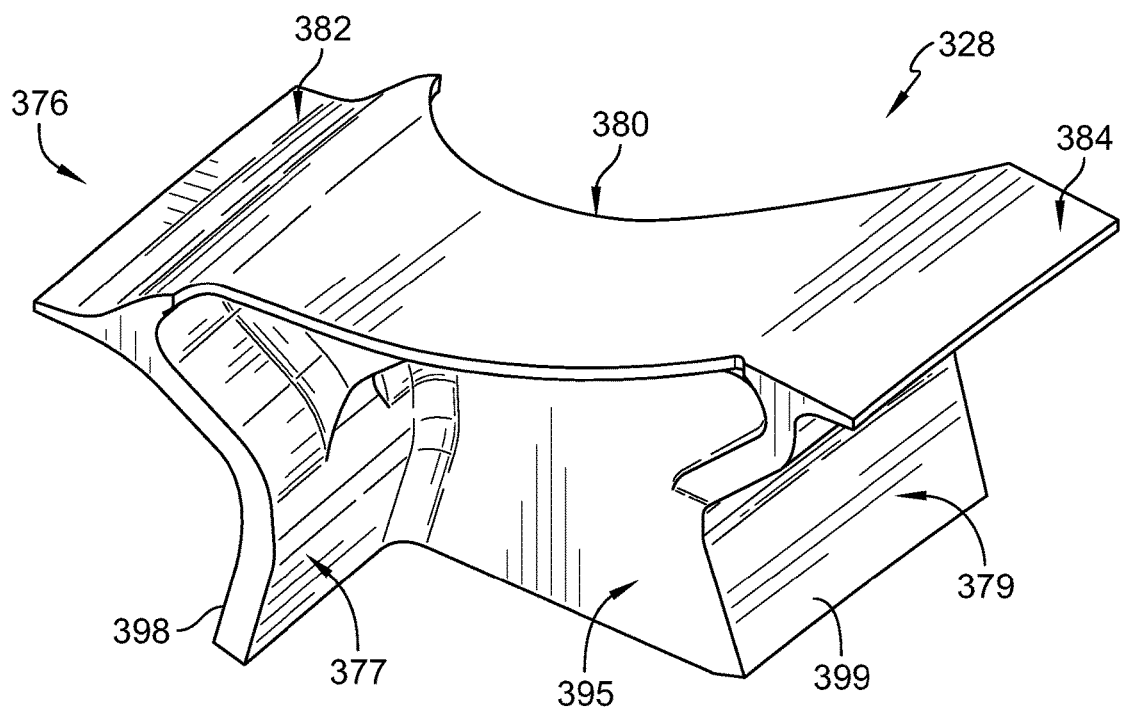
FIG. 11 is a top perspective view of a platform included in the turbine wheel assembly of FIG. 10 showing that the platform includes an outer radial wall, a fore wall, an aft wall spaced apart axially from the fore wall, and a support wall that extends axially between and interconnects the fore and aft walls.
Figure 12:
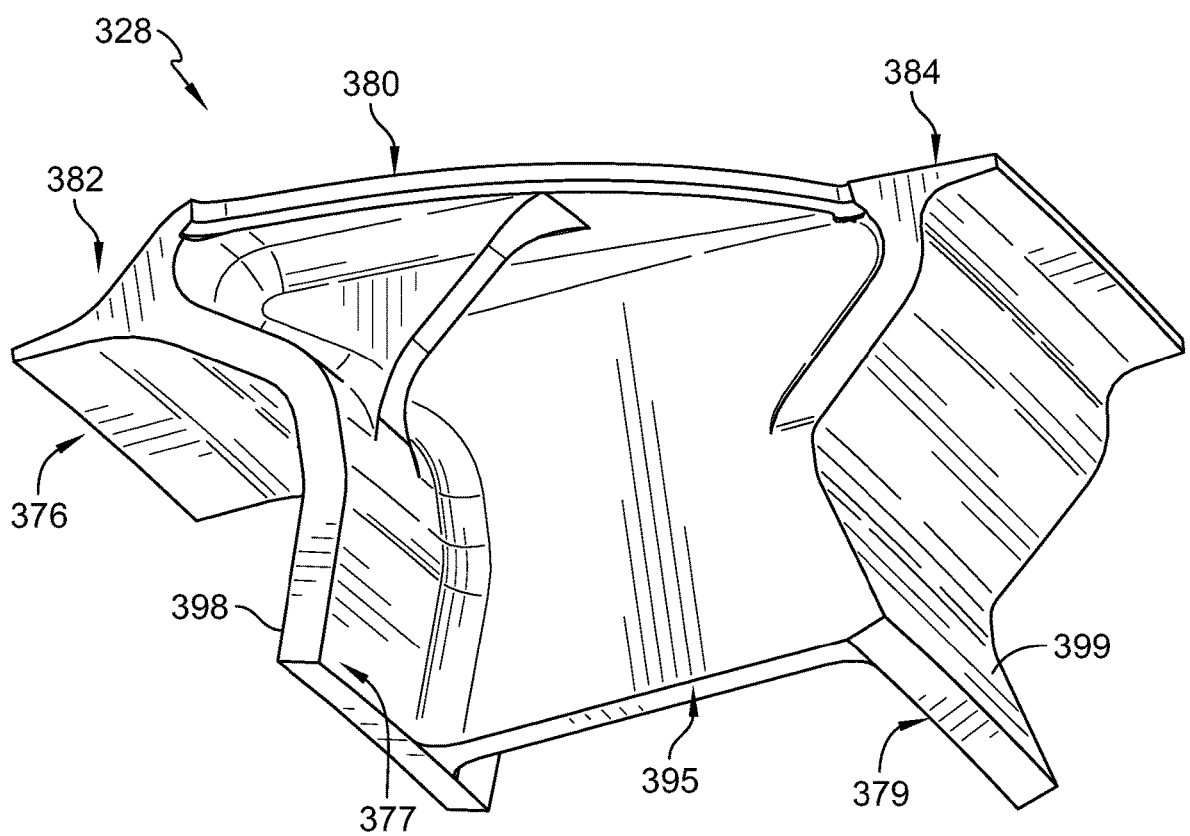
FIG. 12 is a bottom perspective view of the platform of FIG. 11.

Each platform 328 includes the outer radial wall 376, the fore wall 377, and the aft wall 379 as shown in FIGS. 11 and 12. The outer radial wall 376 is arranged to extend partway around neighboring blades 326. The fore wall 377 extends radially inward away from the outer radial wall 376. The aft wall 379 extends radially inward away from the outer radial wall 376 and is spaced apart axially from the fore wall 377. The fore wall 377 and the aft wall 379 cooperate to define a dovetail shaped passage that receives a portion of a blade 326. In other embodiments, the passage may be any other complementary shape to that of the roots of the blades 326. Illustratively, each platform 328 further includes the support wall 395 that extends axially between and interconnects the fore wall 377 and the aft wall 379. Each platform 328 is an integral one-piece component in illustrative embodiments.

The outer radial wall 376 includes a panel 380, a fore wing 382, and an aft wing 384 as shown in FIGS. 11 and 12. The panel 380 is configured to be arranged partway around the blades 326. The fore wing 382 extends axially forward away from the panel 380 toward a front of the fore-disk segment 334. The aft wing 384 extends axially aft away from the panel 380 toward a rear of the aft-disk segment 336.

The fore wall 377 extends circumferentially as shown in FIG. 11. The fore wall 377 is continuous and formed without holes in the illustrative embodiment. The fore wall 377 includes an outer surface 398 that engages the aft-facing engagement surface 348 of the fore-disk segment 334.

The aft wall 379 extends circumferentially as shown in FIG. 11. The aft wall 379 is continuous and formed without holes in the illustrative embodiment. The aft wall 379 includes an outer surface 399 that engages the fore-facing engagement surface 357 of the aft-disk segment 336. The aft wall 379 is offset circumferentially from the fore wall 377 as shown in FIGS. 11 and 12. The fore wall 377 is configured to overlap a portion of a first blade 326 and the aft wall 379 is configured to overlap a portion of a second blade 326 that neighbors the first blade 326. The fore and aft walls 377, 379 provide a layer of material between the disk 24 and the blades 326 that may reduce wear of the blades 326 caused by rubbing.

The support wall 395 extends axially between and interconnects the fore wall 377 and the aft wall 379 as shown in FIGS. 11 and 12. The support wall 395 is continuous and formed without holes in the illustrative embodiment.

As ceramic matrix composites (CMC) materials and designs mature, they may be used in turbine blade applications. Ceramic matrix composite components may be capable of operating at higher temperatures and deliver cooling air savings and/or specific fuel consumption reductions. Ceramic matrix composite components may offer weight reductions as compared to a metallic blade system. Ceramic matrix composite blades may be lighter than metallic blades and the size and weight of the disks may also be reduced when using ceramic matrix composite blades.

The ceramic matrix composite material may also have a reduction in strength as compared to metallic blades. Using ceramic matrix composite blades with designs similar to or based on metallic blades in an existing systems may not be practical. The present disclosure provides a wheel assembly configured to reduce the stress at the attachment of the blade by flipping the orientation of the attachment feature of the blade to extend circumferentially.

Generally attachments on blades are oriented with the axis of the engine (axially). Flipping this general orientation from axially to circumferential (or tangential) may allow the stalk/attachment region to be larger/thicker effectively reducing the pressure over area stress. In some embodiments, the platform features are removed from the blade component and instead incorporated as an offloaded part. With such configurations, the blade attachment may not support the centrifugal load associated with the platforms. The platform component of each embodiment of the present disclosure could be made from metallic or ceramic matrix composite materials.

In one embodiment, the blades and the platforms are paired with a dual disk (multi-piece) as shown in FIGS. 2-7. The blades and platforms may be assembled outside of the disk components to form a full ring of blades. The forward disk would slide from the front to make contact with the forward dovetail faces of the blades and platforms. Then the aft disk would slide into position relative to the other components to retain all blades and platforms radially and axially.

The platforms are illustratively cut (or formed) to match the shape of the airfoils. This allows the platforms to be installed circumferentially and pressed against the adjacent blade. The platforms may also be installed radially. The platforms may have features to trap a seal and possibly damper against the airfoil. FIG. 7 shows a chamfer configured to guide the platform to be in contact with the airfoil. The platform 28 integrates "angel wings" to interface with forward and aft vanes included in the turbine 18. The platforms 28 illustratively have an attachment feature 88 that matches the attachment features 66 in the blades 26. The attachment rib of the platforms 28 may extend to the forward and aft edges of platform to stiffen the "angel wings" and limit deflections under centrifugal load.

Another embodiment of a platform 228 is shown in FIGS. 8 and 9. The additional support strut 279 can be hooked as shown in FIG. 8 or could be an angled face to create another dovetail feature. Illustratively, the support strut 279 extends the entire circumferential length of the platform 228. The rib 278 is spaced apart from edges of the platform 228. The additional support strut 279 may reduce the overall load on the primary platform dovetail feature and to reduce the deflections at the front and aft of the platform 228.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A wheel assembly for a gas turbine engine, the wheel assembly comprising
    a multi-piece disk adapted to rotate about an axis during use of the gas turbine engine, the multi-piece disk including a fore-disk segment and an aft-disk segment located axially aft of the fore-disk segment to define a dovetail shaped blade-receiver channel that extends circumferentially around the axis, and
    a blade adapted to interact with gases during use of the gas turbine engine, the blade including a root and an airfoil that extends radially away from the root, and the root having a dovetail shaped portion when viewed circumferentially relative to the axis and located in the dovetail shaped blade-receiver channel.

2. The wheel assembly of claim 1, wherein the fore-disk segment includes a fore body and a fore band arranged circumferentially around the fore body, the aft-disk segment includes an aft body and an aft band arranged circumferentially around the aft body, and an aft-facing engagement surface included in the fore band of the fore-disk segment and a forward-facing engagement surface included in the aft band of the aft-disk segment cooperate to block the root of the blade from exiting the blade-receiver channel at any orientation of the blade relative to the axis.

3. The wheel assembly of claim 1, further comprising a platform that includes an outer radial wall arranged partway about the blade to define a boundary of a flow path of the gases, a fore wall that extends radially inward relative to the outer radial wall, and an aft wall that extends radially inward relative to the outer radial wall, the aft wall is spaced apart axially from the fore wall to define a dovetail shaped passage when viewed circumferentially, and at least a portion of the root of the blade is located in the dovetail shaped passage.

4. The wheel assembly of claim 3, wherein the platform further includes a support wall that extends axially between and interconnects the fore wall and the aft wall.

5. The wheel assembly of claim 3, wherein the fore wall and the aft wall are located in the blade-receiver channel defined by the multi-piece disk, the fore wall engages the fore-disk segment, and the aft wall engages the aft-disk segment.

6. The wheel assembly of claim 1, further comprising a platform that includes an outer radial wall arranged around at least a portion of the blade to define a boundary of a flow path of the gases and a rib that extends radially inward from the outer radial wall, the rib is located in the blade-receiver channel, and a portion of the rib is dovetail shaped when viewed circumferentially.

7. The wheel assembly of claim 6, wherein the root of the blade has a first side face and a second side face spaced apart circumferentially from the first side face, the rib of the platform has a first side face and a second side face spaced apart circumferentially from the first side face of the rib, and the second side face of the rib engages directly the first side face of the of the root of the blade.

8. The wheel assembly of claim 7, wherein the root of the blade includes a stem and an attachment feature that extends radially inward from the stem of the root and engages the fore-disk segment and the aft-disk segment, the rib of the platform includes a stem and an attachment feature that extends radially inward from the stem of the rib, and the attachment feature of the root and the attachment feature of the rib have substantially similar profiles when viewed circumferentially.

9. The wheel assembly of claim 6, wherein the outer radial wall of the platform includes a first edge and a second edge spaced apart circumferentially from the first edge and the rib is spaced apart circumferentially from the first edge and the second edge.

10. The wheel assembly of claim 6, wherein the outer radial wall of the platform includes a panel arranged partway around the blade, a fore wing that extends axially forward away from the panel toward a front of the fore-disk segment, and an aft wing that extends axially aft away from the panel toward a rear of the aft-disk segment, the rib of the platform includes a stem and an attachment feature that extends radially inward from the stem, the stem of the rib extends axially along the fore wing, the panel, and the aft wing, and the attachment feature of the platform is located in the blade-receiver channel.

11. The wheel assembly of claim 6, wherein the rib of the platform includes a stem and an attachment feature that extends radially relative to the stem, the platform further includes a support strut that extends axially into the fore-disk segment and the aft-disk segment, the support strut is located radially between the outer radial wall and the attachment feature of the rib, and the support strut extends circumferentially beyond the attachment feature of the rib.

12. A wheel assembly comprising
    a disk formed to define a blade-receiver channel that extends circumferentially completely around the axis, and
    a blade that comprises ceramic materials and that includes a root located in the blade-receiver channel and an airfoil that extends radially away from the root, the root includes a stem coupled with the airfoil and a circumferentially extending attachment feature located in the blade-receiver channel.

13. The wheel assembly of claim 12, further comprising a platform that includes an outer radial wall arranged partway about the blade to define a gas flow path, a fore wall that extends radially inward relative to the outer radial wall, and an aft wall that extends radially inward relative to the outer radial wall, and the aft wall is spaced apart axially from the fore wall to define a dovetail shaped passage that receives at least a portion of the root of the blade.

14. The wheel assembly of claim 13, wherein the platform further includes a support wall that extends axially between and interconnects the fore wall and the aft wall.

15. The wheel assembly of claim 13, wherein the fore wall of the platform is offset circumferentially relative to the aft wall of the platform.

16. A method comprising
providing a multi-piece disk having a first-disk segment and a second-disk segment and a blade that includes a root and an airfoil that extends radially away from the root relative to an axis, the root being dovetail shaped when viewed circumferentially relative to the axis,
locating the root of the blade in a circumferentially extending passage formed in the first-disk segment, and
moving the second-disk segment toward the first-disk segment to locate the root of the blade in a circumferentially extending passage formed in the second-disk segment.

17. The method of claim 16, further comprising providing a platform having an outer radial wall, a fore wall that extends radially, and an aft wall that extends radially, the aft wall is spaced apart axially from the fore wall to provide a dovetail-shaped passage therebetween, and the method further includes moving the platform relative to the blade to receive the root of the blade in the dovetail-shaped passage.

18. The method of claim 17, further comprising engaging directly the first-disk segment with the fore wall of the platform and the second-disk segment with the aft wall of the platform and blocking relative axial movement between the first-disk segment and the second-disk segment.

19. The method of claim 16, further comprising providing a platform having an outer radial wall and a rib that extends radially inward away from the outer radial wall, the rib having a dovetail shaped portion when viewed circumferentially, and the method further comprising locating the rib in the circumferentially extending passage formed in the first-disk segment before the moving step.

20. The method of claim 19, further comprising engaging directly the rib of the platform with the root of the blade.

* * * * *